June 19, 1945.   W. C. EDMISTER   2,378,542
METHOD AND APPARATUS FOR CATALYTIC PROCESSES
Filed Aug. 30, 1941   2 Sheets-Sheet 1

Inventor:
Wayne C. Edmister,
By: Everett A. Johnson
Attorney.

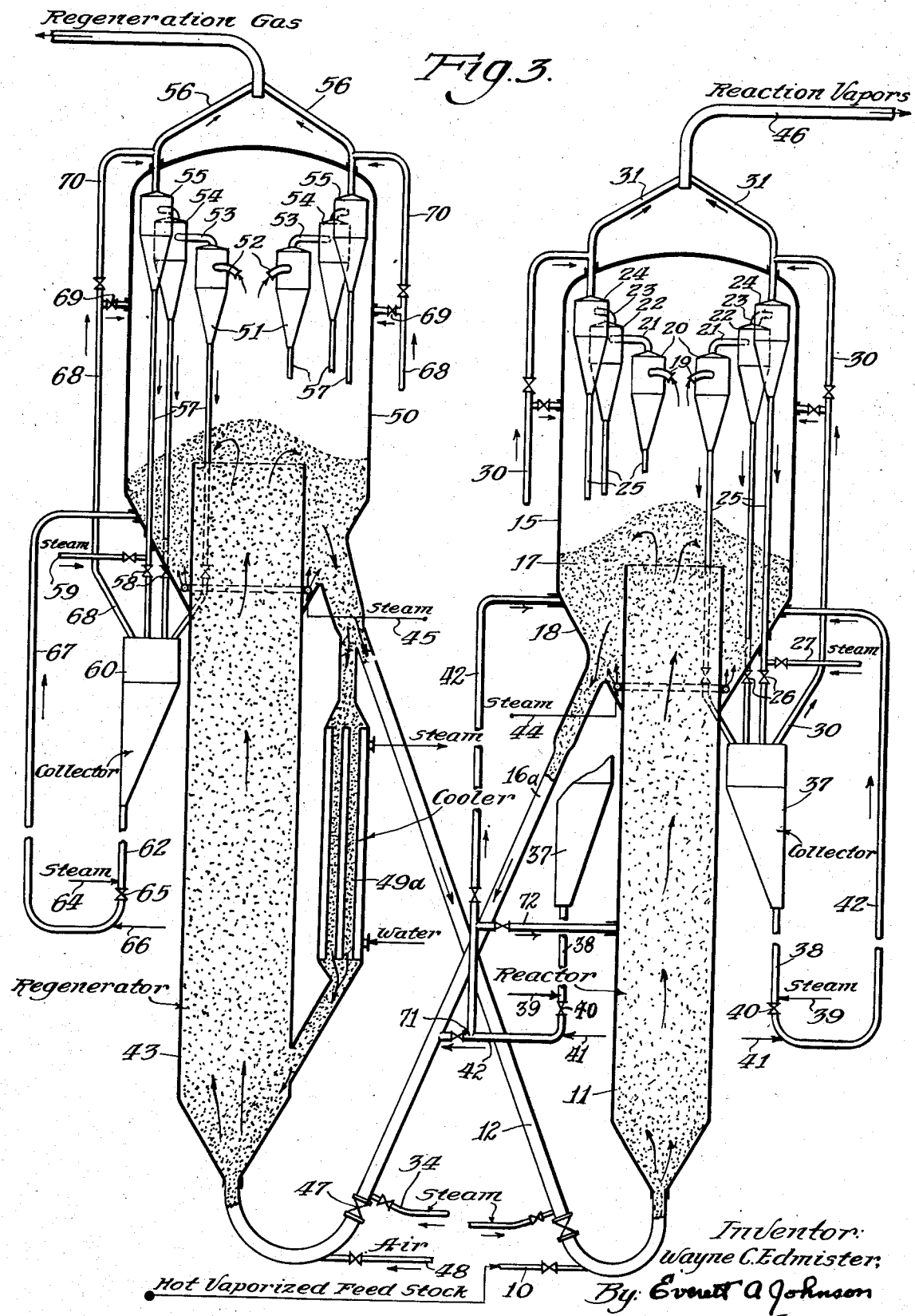

Patented June 19, 1945

2,378,542

UNITED STATES PATENT OFFICE 2,378,542

METHOD AND APPARATUS FOR CATALYTIC PROCESSES

Wayne C. Edmister, Flossmoor, Ill., assignor to Standard Oil Company, Chicago, Ill., a corporation of Indiana Application August 30, 1941, Serial No. 409,071

11 Claims. (Cl. 196—52)

My invention pertains to a catalytic hydrocarbon conversion system and it relates more particularly to improvements in processes and apparatus for handling fluent catalyst in a so-called fluid-type hydrocarbon catalytic conversion system.

In the fluid-type catalytic conversion system a powdered or granulated catalytic material effects conversion while the catalyst is suspended in the gases or vapors undergoing reaction. Subsequently the catalyst and reaction products can be separated and the catalyst recycled to a reaction zone or regenerated. The spent catalyst can be regenerated by suspending it in a gas mixture in which case the regenerated catalyst and regeneration gases must be separated before the catalyst is returned to the reaction zone. In such systems the fluent solid catalyst can be pneumatically conveyed to high levels and passed through standpipes, dip legs, or other conduits from high levels to low levels and from zones of relatively greater or lower pressure. If there is any interruption in this flow of separated solids in a conduit there is a tendency of the solids to bridge and thereby cause a plugging of the conduit. An object of my invention is to provide method and apparatus for effecting the desired flow of fluent solid catalyst and prevent such catalyst bridging or plugging.

A further object of my invention is to provide improved methods and means for recovering finely divided catalyst particles from gases or vapors from a reaction or regeneration zone and for returning the separated catalyst to the system. In the recovery of powdered catalyst from reaction gases or regeneration gases by a system of cyclone separators operating in stages there must necessarily be a pressure drop across each stage; an object of my invention is to provide improved method and means for effecting the desired operating pressures in these various stages and to secure positive operation of each cyclone separator in the system. A further object is to provide improved methods and means for increasing the efficiency of a multi-stage cyclone system. A still further object is to provide improved methods and means for making cyclone separator dip legs accessible and for obtaining access to valves for controlling the operation of each cyclone separator.

A further object is to provide improved methods and means for admixing the recovered fine catalyst particles with coarse catalyst particles separated within the reaction or regeneration zones by settling or other means. Another object is to provide a system wherein gases or vapors are employed to return cyclone separated catalyst to the system. Still another object of my invention is to provide a system wherein these gases or vapors can also function to effect an admixture of catalyst fines with coarser catalyst and to effect a stripping or purging of both fine and coarse catalyst. Other objects of my invention will become apparent as the detailed description thereof proceeds.

In practicing my invention I may superimpose a large main hopper above a reaction or regeneration chamber, or both, the large hopper being connected to the reaction or regeneration zone near the top of such zone by an outwardly and upwardly extending wall. A plurality of cyclone separators are mounted in the enlarged hopper and around its periphery so that the cyclone dip legs extend through the bottoms of the main hopper into an outside collecting hopper or hoppers. Steam for aerating catalyst in the dip leg may be introduced into the dip leg at an accessible point outside the main hopper and likewise an exposed control valve is readily accessible. Catalyst from the exterior collection hopper or hoppers may be injected into the interior main hopper. Likewise the catalyst may be injected into the dense phase or coarse catalyst recovered from the reactor or regenerator by means of steam. This steam may serve as the stripping and aerating gas for freeing spent and regenerated catalyst from vapors and gases. By injecting the cyclone separated catalyst into the settled or dense phase catalyst, it is transferred therewith.

In accordance with my present invention, the cyclone dip legs deliver the recovered catalyst to a collector hopper or hoppers external to the reactor or regenerator. I maintain a substantially constant pressure in said hopper or hoppers which preferably is not substantially greater than the pressure in the interior main hopper. The maintenance of a constant pressure in the collector hopper is essential both from the standpoint of regulating catalyst discharge thereto from the cyclone dip legs and from the standpoint of regulating catalyst transfer therefrom.

These external hoppers may be in the form of a multiplicity of hoppers, one for each set of cyclones, or the dip legs can deliver to a common hopper which can suitably be doughnut-shaped and inclined from which the recovered catalyst can be withdrawn. In one embodiment four sets of three-stage cyclones can be used. It is contemplated, however, that when desired a set may comprise a common tertiary cyclone for each of two parallel groups of cyclones composed of primary and secondary units.

Recovered catalyst can be transferred from the hopper or hoppers either to the interior main hopper, directly to the same or another reactor or regenerator, or injected into a settled or dense phase being transferred. The invention will be more clearly understood from the following detailed description taken with the accompanying drawings illustrating the invention and forming a part of the specification.

Referring to the drawings:

Figure 3 is a schematic flow diagram showing one embodiment of my invention as applied to a catalytic cracking system employing a plurality of external collector hoppers and an internal annular catalyst settling zone.

All of the figures are diagrammatic. Corresponding parts of the several figures are designated by like reference numerals.

Figure 1:
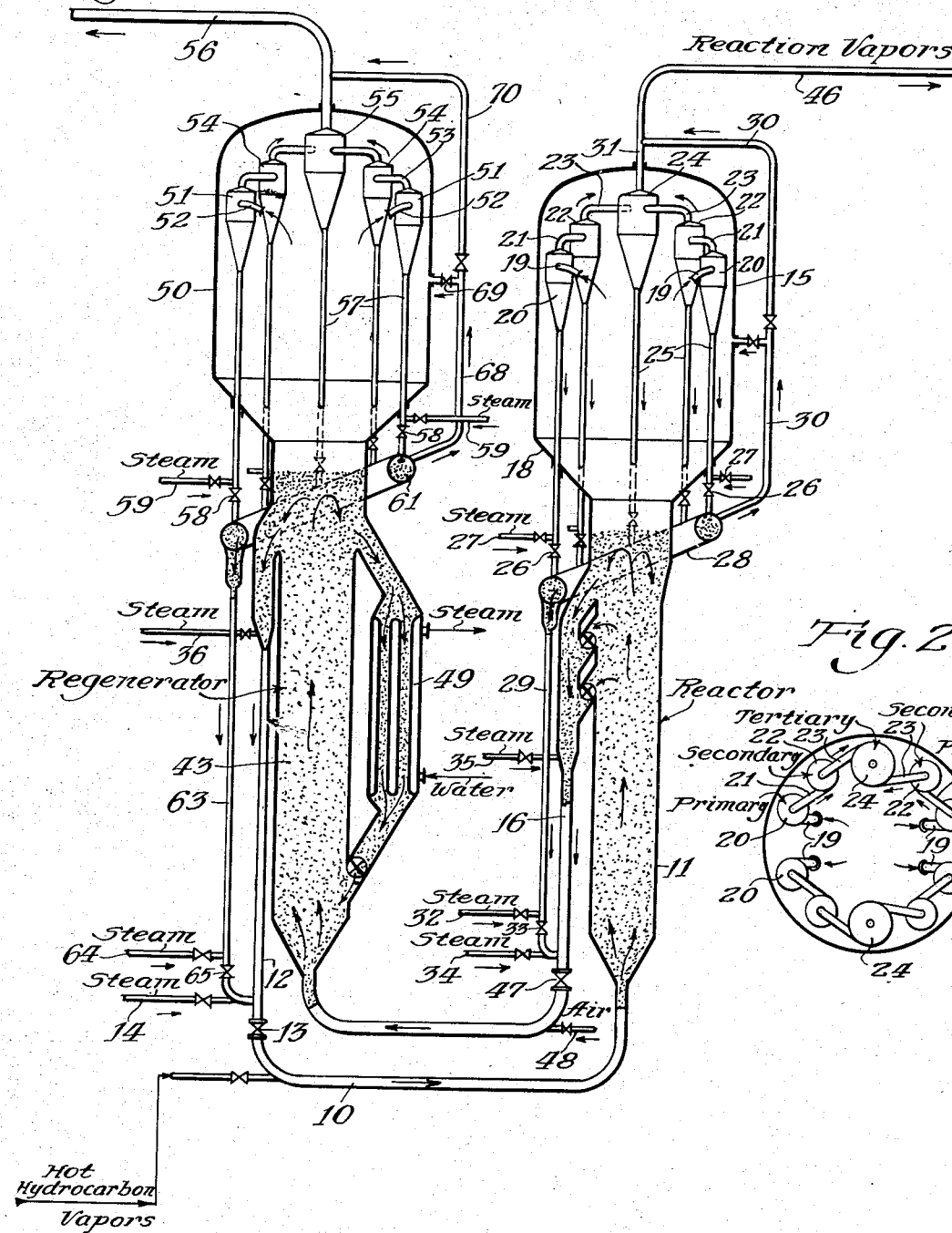
Figure 1 is a schematic flow diagram illustrating a modification of the invention employing a common external annular collector hopper.

Although my invention is applicable to a wide variety of catalytic conversion systems it is primarily designed for hydrocarbon conversion processes such as alkylation, aromatization, dehydrogenation, desulfurization, gas reversion, hydrocarbon synthesis, as for example from natural gas or coal, hydrogenation, isoforming, isomerization, polymerization, reforming, etc., and it is particularly applicable to the catalytic cracking of gas oil and reduced crude for the production of high antiknock motor fuels. The charging stock may consist of or may contain hydrocarbons produced or recovered from other conversion process, hydrocarbons produced by a carbon monoxide-hydrogen synthesis, distillate from high pressure wells, or the like. In the illustrative embodiment I will describe the invention as applied to the catalytic cracking of Mid-Continent gas oil.

The feed stock is vaporized and heated, for example in conventional pipe still furnace (not shown), to a temperature of between about 800° F. and about 1050° F., for example about 900° F., and is introduced at a pressure between about atmospheric and about 50 pounds per square inch, for example about 15 pounds per square inch, through transfer line 10 to the bottom of reactor 11. Varying quantities of steam, i. e., between about 2% and about 20% by weight, can be included with the hot vapors introduced to the transfer line. The vapors in transfer line 10 pick up powdered catalyst from the base of standpipe 12 in amounts regulated by valve 13 and carry the catalyst into reactor 11. The pressure at the base of standpipe 12 should be between about 1 and about 5 pounds per square inch higher than the pressure in transfer line 10. The catalyst in standpipe 12 is maintained in fluent condition by aeration steam introduced through line 14.

Reactor 11 should be of such size and shape as to effect contact of the vapors with the desired amount of catalyst for the required period of time. Catalysts adapted to my process are, for example of the silica-alumina or silica-magnesia type. The catalyst can be prepared by the acid treating of natural clays such as bentonite or by synthetically preparing a powdered silica-alumina or silica-magnesia mixture. Such a mixture can be prepared by ball-milling silica hydrogel with alumina or magnesia, drying the resulting dough at a temperature of about 240° F. and then activating by heating to a temperature of between about 900° F. and about 1000° F. The catalyst per se forms no part of the present invention and it is, therefore, unnecessary to describe it in further detail.

When using powdered catalyst having a particle size of between about 1 and about 100 microns, I prefer to employ vapor velocities in the reactor of between about 0.4 and about 4 feet per second, for example about 1.5 or 2 feet per second. The catalyst-to-oil weight ratio for catalytic cracking can be between about 1:1 and about 20:1 and is preferably about 3 or 4 to 1. The catalyst residence time may range from a few seconds to an hour or more, for example it may be about 4 to 10 minutes. The vapor residence time is usually about 10 to 30 seconds. The temperature prevailing throughout the reactor may be maintained at about 900° F. to about 925° F.

The catalyst in this specific example is in powder form with a particle size of between about 1 and about 100 microns, i. e., with about 50% of the catalyst passing a 400-mesh screen. The invention is applicable, however, to other catalyst sizes provided only that the catalyst is such size and density that it can be aerated and handled as a fluid in the manner herein described. Higher gas or vapor velocities may be required for coarser catalyst particles but these particles can be of such size as to be retained on a 400, 300, 200, 100, or even 50-mesh screen.

The density of the catalyst particles per se may be as high as 160 pounds per cubic foot, but the bulk density of the catalyst which has settled for five or ten minutes will usually be from about 35 to about 60 pounds per cubic foot. With slight aeration, i. e. with vapor velocities of between about 0.05 and about 0.5 feet per second, the bulk density of 1 to 100 micron catalyst will be between about 20 and about 30 pounds per cubic foot. With vapor velocities of between about 1 and about 3 feet per second the catalyst is in the dense turbulent suspended catalyst phase and the bulk density of such catalyst may be between about 10 and about 20 pounds, for example about 15 to 18 pounds per cubic foot. With higher vapor velocities, i. e., the vapor velocities existing in transfer lines, the catalyst is in a dilute dispersed phase, the density of which may be only about 1 or 2 pounds per cubic foot, or even less. Similarly, the light dispersed catalyst phase in the top of the reactors or regenerators can have a density of between about 50 or 100 grains and about 3 pounds per cubic foot. The light dispersed catalyst phase is at least 5, and preferably is at least 12 pounds per cubic foot lighter than the dense turbulent suspended catalyst phase. This latter phase is at least 1, preferably at least 5 pounds per cubic foot lighter than the aerated catalyst being transferred to the dense phase.

The bulk density of the aerated catalyst phase or the dense turbulent suspended catalyst phase is greater in the absence of appreciable catalyst fines than in the presence of substantial amounts of such fines. When the recovered catalyst consists almost entirely of fines, as exemplified by catalyst particles separated from the dilute phase by cyclones, the bulk density of settled or lighter aerated catalyst may be only 10 or 15 pounds per cubic foot.

The upward vertical velocity of vapors in reactor 11 is at such a rate as to maintain the catalyst within the reactor in the dense, turbulent suspended catalyst phase. The reactor 11 may extend upwardly into main hopper 15 as shown in Figure 3, so that the annular space between the walls of the reactor 11 and the walls of the hopper 15 will provide an accumulation zone for settled catalyst. If desired, the diameter of the reactor may be narrowed at its upper end. When the reactor is not restricted, however, the catalyst can flow directly from the reactor 11 to the standpipe 16 as shown in Figure 1, or to the annular accumulation zone 17 of Figure 3 and thence to standpipe 16a without the bulk of the catalyst passing from the dense to the dilute phase. Any catalyst particles which remain suspended in the dilute phase are recovered by means of cyclone separators.

The enlarged main hopper 15 is connected to the reactor by outwardly and upwardly extending wall 18 forming the bottom of the hopper. Inside the hopper 15 and around the periphery thereof I provide a plurality of cyclone separators. I may employ one, two, three or more stages of cyclone separators in each set and I may have two or more parallel sets. The dip legs from each of the cyclones extend through the base of the enlarged main hopper 15 to collector hopper or hoppers whereby control valves and aeration ports are exterior of the reactor and main hopper and therefore easily accessible.

Gas and catalyst fines from the upper part of the hopper 15 may be picked up by one or more lines 19 at a pressure of about 8 pounds per square inch and conducted to primary cyclones 20. There is a pressure drop through each of the primary cyclones 20 and each of the succeeding stages so that gases may leave cyclones 20 through line 21 to secondary cyclones 22, lines 23 and tertiary cyclones 24. Each of the cyclones has its respective dip leg 25 which passes substantially vertically downward through the base of hopper 15 and which has an external regulating valve 26 near its base. Aeration steam may be introduced into each dip leg by ports 27 at a point above the respective external valves 26 for maintaining the settled catalyst in the dip leg in aerated condition.

Figure 2:
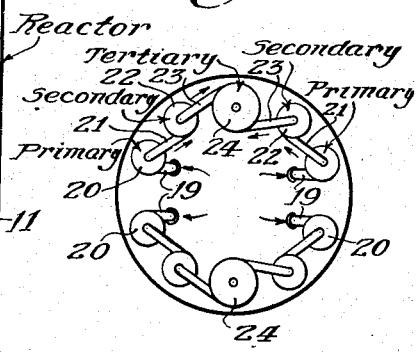
Figure 2 is a top view showing the arrangement of cyclone separators of Figure 1.

Referring more particularly to Figures 1 and 2, I contemplate the use of a common tertiary cyclone 24 for each of two parallel groups of cyclones composed of primary and secondary units giving a total of ten dip legs 25 delivering to a common annular hopper 28 which is inclined and discharges the recovered catalyst into standpipe 29. Aeration steam may be introduced into collector standpipe 29 for maintaining the settled catalyst in aerated condition. Likewise, the collection hopper or hoppers can be aerated to insure complete delivery of catalyst therefrom. Line 30 communicates with the dilute phase in hopper 15 or with discharge conduit 31, thus assuring flow of catalyst into collector hopper 28. Near the base of standpipe 29, aerating steam inlet 32 and regulating valve 33 may be provided. If desired the standpipes 29 and 16 may be merged near the top of 16. Steam from line 34 picks up catalyst from the base of standpipe 29 and introduces this catalyst into main standpipe 16 in which spent catalyst is being transferred or into the same or a different reactor or regenerator. The steam which is thus introduced into the main standpipe 29 serves to admix the catalyst fines with the coarser catalyst particles and to effect a degree of stripping of hydrocarbon vapors from both the fine and coarse catalyst in the standpipe 16. Additional stripping gas may be introduced, for example by lines 35 and 36.

With reference to Figure 3, the dip legs 25 of each set of cyclones discharge into a separate collection hopper 37. The dip legs may be run into the hoppers directly as shown, or may join and enter hoppers by means of a common gathering line. Likewise, the dip legs of the primary and secondary cyclones can join the dip leg of the tertiary cyclone which in turn discharges into the hopper. The dip leg extending from the tertiary stage should extend vertically to the collection hopper. The hopper standpipes 38 are provided at their base with an aerating steam inlet 39, regulating valve 40 and a steam line 41 for returning the catalyst to the upper hopper 15 by line 42.

Alternatively the recovered catalyst can be injected into the same or different reactor and/or regenerator. Thus the cyclone separated catalyst can be returned to the reactor 11 by line 72. The recovered catalyst fines may be injected into the regenerator at an intermediate or upper point. Likewise, it may be injected by line 71 into the standpipe 16 or 16a transferring the spent catalyst to the regenerator 43. The steam which is introduced by lines 42 with recycle catalyst will furnish the necessary aeration and stripping steam for the main hopper 15. I can, of course, introduce additional aeration or stripping steam into hopper 15 by conventional means. For example, steam may be supplied near the base of the annular settling zone of the reactor or regenerator by lines 44 and 45. The rate of injection of carrier steam through lines 41 or the adjustment of valves 40 may be automatically controlled in accordance with the pressuring head in the standpipes 38 for insuring smooth and continuous catalyst discharge therefrom.

The vapors are withdrawn from the separation zone through line 46 to a suitable fractionation and recovery system (not shown). The product fractionation forms no part of the present invention and it will not be described in detail. I prefer, however, to effect the fractionation of the heavier products at a relatively low pressure, as for example about 5 pounds per square inch. Any unrecovered catalyst may be recycled with the heaviest condensate with fresh feed. The overhead from this initial fractionation is preferably cooled to condense and separate water. The remaining hydrocarbons can then be fractionated at high pressure, between about 100 pounds per square inch and about 150 pounds per square inch in any suitable arrangement of fractionators, absorbers, stabilizers, etc., to obtain the desired gas and gasoline fractions.

Spent catalyst is withdrawn by standpipe 16 or 16a which is aerated by steam introduced by line 34 immediately above control valve 47. Catalyst is picked up from the base of this standpipe by air introduced through line 48 and is carried thereby into regeneration chamber 43 which is similar to conversion reactor 11 although it may be larger in size, particularly if temperature control is effected by recycling regenerated catalyst through a cooler 49 or 49a and back to the regenerator 43. The regenerator can be suitably designed for a vertical gas velocity of between about 0.4 and about 4.0 feet per second, preferably about 2 feet per second, so that a dense turbulent suspended catalyst phase is maintained therein. The regenerator 43 is superimposed by an enlarged hopper 50 which is connected to the reactor by upwardly and outwardly extending walls forming the bottom of the hopper 50. In Figure 3 the annular space between the walls of regenerator 43 and the walls of the hopper 50 form an accumulation zone for regenerated catalyst.

Any catalyst particles which remain suspended in the dilute phase are removed therefrom by means of cyclone separators mounted inside the main hopper 50 and around the periphery thereof, arranged in a manner similar to that described in connection with the reactors. Thus regeneration gases enter primary cyclone 51 through line 52. The gases from primary cyclone 51 are introduced through line 53 to secondary cyclone 54 and thence to the tertiary cyclone 55. Any number of stages can be used. The final regeneration gases are withdrawn through line 56 and residual catalyst fines may be removed from regeneration gas by an electric precipitator.

Separated catalyst from the cyclones passes through the respective dip legs 57 which extend through the bottom of hopper 50 and are provided with external operating valves 58 and aeration ports 59. The dip legs 57 discharge into collection hoppers 60 or 61 which are the counterpart of the collection hoppers 37 and 28 respectively, previously described in connection with the recovery of spent catalyst from the reactors. Thus the dip legs may be run into the hoppers directly or may join and enter hoppers by means of a common gathering line. Likewise, the dip legs of the primary and secondary cyclones can join the dip leg of the tertiary cyclone which in turn discharges vertically into the hopper. If desired the dip legs 57 of each set of cyclones discharge into a separate collection hopper 60.

The hopper standpipes 62 and 63 are provided at their base with an aerating steam inlet 64, regulating valve 65, and a steam line 66 or 14, respectively. In Figure 3 the catalyst is illustrated as returning to the main hopper 50 by line 67. Alternatively, the recovered regenerated catalyst can be injected into the same or different regenerator and/or reactor. Likewise, the recovered catalyst fines may be injected into the dense catalyst flowing through cooler 49a. It is also contemplated as shown in Figure 1 that the recovered catalyst may be injected into the standpipe 12 transferring the regenerated catalyst to the reactor 11. Generally the flow of the catalyst described in connection with the reactor finds its counterpart in the regeneration stage.

Temperature control in the regenerator may be effected by withdrawing dense phase regenerated catalyst from the regenerator, passing it through a cooler 49 or 49a and reintroducing it at the base of the regenerator. The cooler can be a heat exchanger comprising vertical tubes and shell. The aerated catalyst preferably passes through the tubes. Water or other heat transfer fluid may be introduced into the shell and hot fluids such as steam withdrawn. The level of the liquid phase in the shell can be controlled to regulate the extent of heat exchange. Alternatively, Sterling-type boiler tubes may be mounted within the regenerator and around the periphery thereof.

The aeration steam is withdrawn from the collector hopper or hoppers 60 or 61 through line 68 and it may be vented through line 69 into the dilute phase of the main hopper 50 or through line 70 to the conduit 56 withdrawing the gases from the regenerator 43. The introduction through line 69 offers the advantage of providing for the recovery of any suspended solids in the steam and venting to the conduit 56 assures better pressure control. A slightly higher pressure is maintained in the collection hoppers then in the main hopper or in the gas or vapor discharge conduit.

Although I have described steam for positively discharging catalyst from dip legs and standpipes it should be understood that mechanical pumps such as Fuller-Kenyon screws or other means than pneumatic can be used in transferring catalyst.

From the above description other modifications and operating conditions will be apparent to those skilled in the art. Therefore, while I have described in detail certain examples of my invention, it should be understood that my invention is not specific to the particular modifications or operating conditions set forth but is defined by the claims.

I claim:

1. In an apparatus for catalytic conversion, a contacting chamber, an enlarged separation chamber above said contacting chamber, a plurality of cyclone separators in said separating chamber, means for accumulating and transferring settled catalyst from said contacting chamber, exterior catalyst collection means, conduit means for transferring cyclone separated catalyst into the collection means exterior of said contacting and separating chambers, and means for impelling said cyclone separated catalyst from said exterior collection means into said means for accumulating and withdrawing settled catalyst.

2. In a catalytic conversion system comprising a vertical contacting chamber, means for introducing catalyst and gases into said contacting chamber whereby a dense turbulent suspended catalyst phase may be maintained therein, a separation chamber superimposed above said contacting chamber, and cyclone separators within said separation chamber, the improvement comprising catalyst conduit means extending downwardly from said cyclone separators to a point exterior of said separation chamber, means for discharging catalyst from said downwardly extending catalyst conduit means into external collection means, and pressuring means for conveying the separated catalyst from said external collection means to a point in said catalyst conversion system wherein catalyst is maintained in a dense phase.

3. The apparatus of claim 2 wherein said separation zone is an enlarged chamber having a laterally extending wall between the contacting zone and the separation chamber, and each of said catalyst conduit means extending substantially vertically through said laterally extending wall.

4. The apparatus of claim 2 which includes a laterally extending wall between said contacting zone and said separation chamber, a pair of primary and secondary cyclone separators in said separation chamber, means for introducing gases from said cyclone separators to a common tertiary cyclone separator, catalyst conduit means extending downwardly from said cyclone separators through said laterally extending wall into an external catalyst accumulation zone, and means for introducing said catalyst at a point below the level of settled catalyst within said separation chamber.

5. In a catalytic hydrocarbon conversion system a vertical reactor, an enlarged settling chamber communicating with the top of said reactor and provided with an internal hopper for maintaining a bed of settled catalyst therein, means for tansferring catalyst from said internal hopper, a plurality of cyclone separators in said settling chamber, the improvement comprising substantially vertical dip legs extending from said cyclone separators through the walls of said chamber to a point outside of said chamber into an exterior collection hopper, a standpipe extending from said exterior hopper, positive catalyst transfer means at the base of said standpipe, and means for introducing catalyst from the base of the standpipe to said internal hopper at a point below the level of settled catalyst therein.

6. The apparatus of claim 2 which includes an annular catalyst receiver and means for maintaining a substantially constant pressure in said receiver slightly in excess of that maintained in the settling chamber.

7. In a catalytic conversion system of the type wherein a gas or vapor passes upwardly in a contacting zone and is contacted in said zone with a dense turbulent suspended catalyst phase, wherein the bulk of the catalyst is removed from gases and vapors in an enlarged settling zone and wherein residual catalyst material is removed from gases or vapors by means of cyclone separators, the method of combining cyclone separated catalyst with settled catalyst which comprises discharging said cyclone separated catalyst into an external collection hopper and positively impelling cyclone separated catalyst into said settling zone.

8. The method of claim 7 wherein a body of settled catalyst is maintained in the lower part of the settling zone and wherein the removed catalyst fines are introduced into the bed of settled catalyst.

9. The method of claim 7 wherein catalyst fines removed from the settling zone immediately following one contacting zone is returned to the system by introducing it directly into a contacting zone.

10. In a catalytic hydrocarbon conversion system wherein hydrocarbon vapors pass upwardly through a reaction zone in contact with a dense turbulent suspended catalyst phase and thence to an enlarged catalyst settling zone wherein spent catalyst from said settling zone is then transferred to a regeneration zone and contacted with regeneration gases flowing upwardly therein at such a velocity as to maintain the catalyst in a dense turbulent suspended catalyst phase, wherein gases from the regeneration zone pass to an enlarged settling zone from which catalyst is transferred to the conversion zone and wherein catalyst fines are separated from gases and vapors leaving said respective settling zones, the method of returning said catalyst fines to the system which comprises discharging said fines from a point within each settling zone to a hopper exterior of the respective contacting zones and settling zones, and positively injecting said fines by means of steam into the settled catalyst flowing from said respective contacting zones whereby the impelling steam effects aeration and stripping of the settled catalyst.

11. In a catalytic conversion system of the type wherein a gas or vapor passes upwardly in a contacting chamber and is contacted in said chamber with a dense turbulent suspended catalyst phase, wherein the bulk of the catalyst is removed from gases or vapors in an enlarged settling chamber and wherein residual catalyst material is removed from gases or vapors by means of cyclone separators, the method of combining cyclone separated catalyst with settled catalyst which comprises introducing cyclone separated catalyst into an external catalyst collection chamber and positively impelling cyclone separated catalyst from said collection chamber into a chamber within the catalytic conversion system containing a body of settled catalyst.

WAYNE C. EDMISTER.